United States Patent Office 3,203,966
Patented Aug. 31, 1965

3,203,966
17α-(HYDROCARBON - SUBSTITUTED)-5α-AN-DROST-2-EN-17β-OLS AND ESTERS THERE-OF
Raymond E. Counsell, Skokie, and Paul D. Klimstra, Northbrook, Ill., assignors to G. D. Searle & Co., Chicago, Ill., a corporation of Delaware
No Drawing. Filed Sept. 25, 1961, Ser. No. 140,199
5 Claims. (Cl. 260—397.5)

This application is a continuation-in-part of our copending application, Serial No. 33,949, filed June 6, 1960, now Patent No. 3,009,934, in which the preparation of the instant 17-hydroxy compounds is described. Their utility as intermediates to the corresponding hypocholesterolemic 2β,3α-halohydrins of that application is disclosed therein.

The present invention is concerned with steroidal alcohols and esters of the androst-2-ene series and, more particularly, with 17α - (hydrocarbon-substituted) - 5α-androst-2-en-17β-ols and the corresponding esters of the structural formula

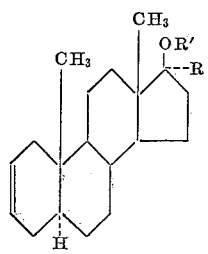

wherein R is a lower aliphatic hydrocarbon radical and R' is hydrogen or a lower alkanoyl radical.

The lower aliphatic hydrocarbon radicals represented by R are exemplified by lower alkyl, lower alkenyl, and lower alkynyl groups such as methyl, ethyl, propyl, butyl, pentyl, hexyl, vinyl, propenyl, butenyl, pentenyl, hexenyl, ethynyl, propynyl, butynyl, pentynyl, hexynyl, and the branched-chain isomers thereof. The lower alkanoyl radicals designated by R' are typified by formyl, acetyl, propionyl, butyryl, valeryl, caproyl, and their branched-chain isomers.

The compounds of this invention are conveniently prepared by reacting 5α-androst-2-en-17-one with an organometallic reagent in which the organic radical is derived from a lower aliphatic hydrocarbon. The preparation of an instant 17-alkyl compound is exemplified by reaction of the aforementioned 5α-androst-2-en-17-one with methyl lithium or with methyl magnesium bromide to produce 17α-methyl-5α-androst-2 - en - 17β - ol. An instant 17-alkynyl compound is obtained by allowing that 17-ketone to react with potassium acetylide, thus affording 17α-ethynyl-5α-androst-2-en-17β-ol. The 17α-alkenyl compounds of this invention can be prepared by reaction of the aforementioned ketone with the appropriate alkenyl organometallic reagent or, alternatively, by hydrogenation of the corresponding instant 17-alkynyl substances. The latter process is specifically illustrated by treatment of the aforementioned 17α-ethynyl-5α-androst-2-en-17β-ol with hydrogen in the presence of palladium-on-calcium carbonate to yield 17α-vinyl-5α-androst-2-en-17β-ol.

Reaction of the 17-hydroxy compounds of this invention with a suitable acylating agent such as a lower alkanoyl halide or lower alkanoic acid anhydride affords the corresponding 17-(lower alkanoates). For example, 17α-ethynyl-5α-androst-2-en-17β-ol is allowed to react with acetic anhydride in pyridine to afford 17α-ethynyl-5α-androst-2-en-17β-ol 17-acetate.

The compounds of this invention are useful also as a result of their valuable pharmacological properties. They are, for example, harmonal agents as is evidenced by their androgenic and anabolic activities. They are of particular interest in view of their oral activity in the latter categories. The instant 17-alkynyl compounds possess also anti-hormonal properties as is demonstrated by their anti-estrogenic activity. In addition, the instant 17-(lower alkanoates) exhibit progestational properties.

The invention will appear more fully from the examples which follow. These examples are set forth by way of illustration only and it will be understood that the invention is not to be construed as limited in spirit or in scope by the details contained therein, as many modifications in materials and methods will be apparent from this disclosure to those skilled in the art. In these examples, temperatures are given in degrees centigrade (° C.). Quantities of materials are expressed in parts by weight unless otherwise noted.

*Example 1*

Method A.—To a solution of one part of 5α-androst-2-en-17-one in 14 parts of dry ether is added, with stirring, 35 parts of 1 molar ethereal methyl lithium over a period of about 45 minutes. Stirring is continued at room temperature for about 20 hours; then the solution is poured cautiously into about 150 parts of ice water. This aqueous mixture is acidified with hydrochloric acid, then is extracted with ether. The organic layer is separated, washed successively with dilute hydrochloric acid, dilute aqueous sodium bicarbonate, and water, then dried over anhydrous potassium carbonate containing decolorizing carbon. This dried solution is stripped of solvent at reduced pressure to afford a glassy solid residue. Recrystallization of this residue from aqueous ethanol produces 17α-methyl-5α-androst-2-en-17β-ol, which melts at about 149–151°. It is represented by the structural formula

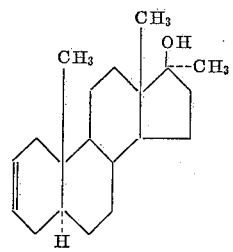

Method B.—To a solution of 13.6 parts of 5α-androst-2-en-17-one in 105 parts of ether is added dropwise, with stirring and cooling, 105 parts of 3 molar ethereal methyl magnesium bromide. The reaction mixture is heated at reflux for about 6 hours, then is stored at room temperature for about 16 hours, and finally is poured cautiously into about 200 parts of 10% aqueous ammonium chloride. The organic and aqueous layers are separated, and the aqueous layer is extracted with ethyl acetate. The ethyl acetate and ether solutions are combined, washed successively with dilute hydrochloric acid, dilute aqueous sodium bicarbonate, and water, then dried over anhydrous potassium carbonate containing decolorizing carbon. Removal of the solvent at reduced pressure affords a glassy residue, which is recrystallized from aqueous ethanol to produce 17α-methyl-5α-androst-2-en-17β-ol, melting at about 150-151°; [α]$_D$=+33° (chloroform). It is identical with the product of Method A.

*Example 2*

A solution of 950 parts of diethylene glycol dimethyl ether and 66 parts of diethylene glycol monomethyl ether is heated, under nitrogen, to about 135°, then is treated portionwise with 180 parts of potassium hydroxide over a period of about 1½ hours. This solution is allowed to cool slowly to room temperature, then is cooled further to about 0°, and is treated with gaseous acetylene for about 2½ hours. A solution of 50 parts of 5α-androst-2-en-17-one in 190 parts of diethylene glycol dimethyl ether is then added over a period of about 1½ hours, and acetylene addition is continued with cooling for about 2½ hours longer. The reaction mixture is diluted with about 450 parts of water, and the resulting aqueous mixture is acidified with ice-cold dilute hydrochloric acid. The precipitate which forms is collected by filtration and washed with water, and the washed precipitate is then dissolved in benzene. This organic solution is dried over anhydrous potassium carbonate containing decolorizing carbon, then is chromatographed on a silica gel column. Elution with 40% petroleum ether in benzene followed by recrystallization from acetone-hexane results in 17α-ethynyl-5α-androst-2-en-17β-ol, M.P. about 171–173°. It is represented by the structural formula

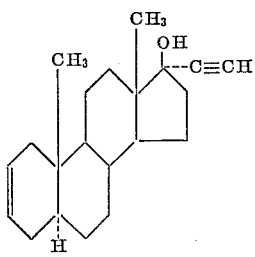

*Example 3*

A solution of 7 parts of 17αethynyl-5α-androst-2-en-17β-ol in 200 parts of pyridine together with 2 parts of 5% palladium-on-calcium carbonate catalyst is shaken in a hydrogen atmosphere at atmospheric pressure and room temperature for about one hour. The catalyst is removed by filtration and the filtrate is diluted with ice and water. The resulting fluffy precipitate is collected by filtration, washed successively on the filter with water, dilute hydrochloric acid, and water, then dried. Recrystallization of this dried solid from aqueous methanol yields 17α-vinyl-5α-androst-2-en-17β-ol, M.P. about 110–112°. It is represented by the structural formula

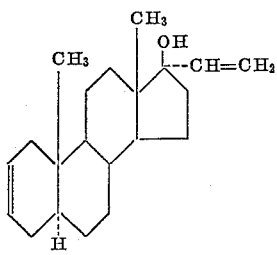

*Example 4*

A mixture of 2 parts of 17α-ethynyl-5α-androst-2-en-17β-ol, 12 parts of acetic anhydride, and 24 parts of pyridine is heated at reflux, under nitrogen, for about 4 hours, then is stored at room temperature for about 16 hours. Dilution of the reaction mixture with water affords a brown precipitate, which is collected by filtration and extracted with ether. The ether extract is washed successively with water, dilute aqueous sodium bicarbonate, dilute hydrochloric acid, and dilute aqueous sodium bicarbonate, then is dried over anhydrous potassium carbonate containing decolorizing carbon, and finally is evaporated to dryness at reduced pressure. The oil which separates initially solidifies on standing. This solid is recrystallized first from aqueous methanol, then from hexane to afford pure 17α-ethynyl-5α-androst-2-en-17β-ol 17-acetate, M.P. about 119–121°. It is represented by the structural formula

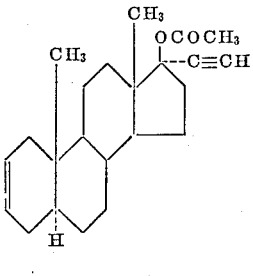

*Example 5*

The substitution of an equivalent quantity of n-butyl lithium in Method A or of n-butyl magnesium bromide in Method B of Example 1 results in 17α-n-butyl-5α-androst-2-en-17β-ol. It is represented by the structural formula

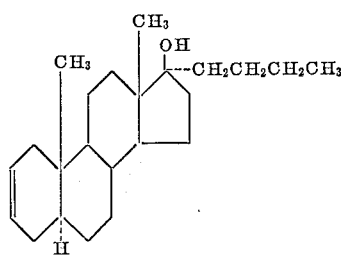

*Example 6*

The substitution of an equivalent quantity of propyne in the procedure of Example 2 results in 17α-propynyl-5α-androst-2-en-17β-ol. It is represented by the structural formula

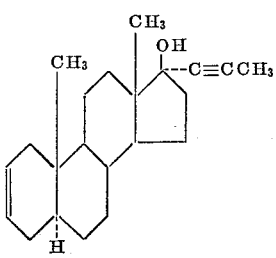

*Example 7*

By substituting an equivalent quantity of 17α-propynyl-5α-androst-2-en-17β-ol and otherwise proceeding according to the procedure of Example 3, 17α-propenyl-5α-androst-2-en-17β-ol is obtained. It is represented by the structural formula

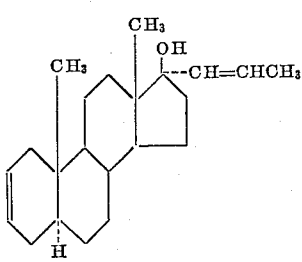

*Example 8*

The substitution of 15.6 parts of propionic anhydride in the procedure of Example 4 results in 17α-ethynyl-5α- androst-2-en-17β-ol 17-propionate. It is represented by the structural formula

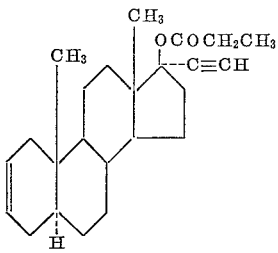

Example 9

The substitution of an equivalent quantity of 17α-methyl-5α-androst-2-en-17β-ol or 17α-vinyl-5α-androst-2-en-17β-ol in the procedure of Example 4 results in 17α-methyl-5α-androst-2-en-17β-ol 17-acetate and 17α-vinyl-5α-androst-2-en-17β-ol 17-acetate.

Example 10

A solution of 10 parts of 17α-ethynyl-5α-androst-2-en-17β-ol in 325 parts by volume of 0.3 N perbenzoic acid in benzene is stored at 3° for about 15 hours. The precipitate which forms is collected by filtration, washed first with benzene, then with hexane, and dried to afford 2α,3α-epoxy-17α-ethynyl-5α-androstan-17β-ol, M.P. about 238–240°. The filtrate is washed successively with concentrated aqueous sodium carbonate and water, then dried over anhydrous potassium carbonate containing decolorizing carbon and evaporated to dryness in vacuo to afford a further quantity of the product. The two crops are combined and recrystallized from acetone to produce a pure sample of the epoxide, M.P. about 237–239°.

Example 11

To a solution of 2.9 parts of 17α-methyl-5α-androst-2-en-17β-ol and 0.4 part of anhydrous sodium acetate in 112 parts of chloroform is added dropwise, with stirring and cooling, 4 parts by volume of 40% peracetic acid in acetic acid solution. This reaction mixture is allowed to stand at room temperature for about 2 hours, then is washed with dilute aqueous potassium hydroxide, dried over anhydrous sodium sulfate, and concentrated to dryness at reduced pressure. The residue is recrystallized from ethanol to afford 2α,3α-epoxy-17α-methyl-5α-androstan-17β-ol, M.P. about 205–207; $[\alpha]_D = +0.5°$ (chloroform).

Example 12

To a solution of 5 parts of 2α,3α-epoxy-17α-ethynyl-5α-androstan-17β-ol in 450 parts of chloroform is added 156 parts of concentrated hydrochloric acid, and the heterogeneous mixture is shaken at room temperature for about 17 minutes. The organic layer is separated, washed with dilute aqueous sodium bicarbonate, and dried over anhydrous potassium carbonate containing decolorizing carbon. This solution is stripped of solvent at reduced pressure to afford an oil which solidifies on standing. Recrystallization from aqueous methanol produces 2β-chloro-17α-ethynyl-5α-androstane-3α,17β-diol, M.P. about 105–109°.

Example 13

A solution of one part of 2α,3α-epoxy-17α-methyl-5α-androstan-17β-ol in 75 parts of chloroform is combined with 18 parts of 47% hydriodic acid, and the resulting heterogeneous mixture is shaken at room temperature for about 25 minutes. At the end of this time, the chloroform layer is separated, washed successively with water containing a small amount of sodium thiosulfate and with dilute aqueous sodium bicarbonate, dried over anhydrous potassium carbonate containing decolorizing carbon, and stripped of solvent at reduced pressure to afford a glassy residue. Chromatography of this residue on silica gel followed by elution with 10% ethyl acetate in benzene and recrystallization from acetone-hexane results in pure 2β-iodo-17α-methyl-5α-androstane-3α,17β-diol, M.P. about 150–151° (dec.).

What is claimed is:

1. A compound of the formula

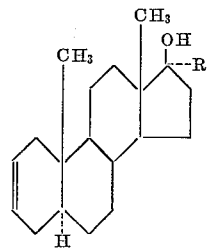

wherein R is a lower aliphatic hydrocarbon radical.

2. A compound of the formula

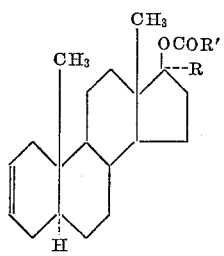

wherein R is a lower aliphatic hydrocarbon radical and R' is a lower alkyl radical.

3. 17α-methyl-5α-androst-2-en-17β-ol.
4. 17α-ethynyl-5α-androst-2-en-17β-ol.
5. 17α-ethynyl-5α-androst-2-en-17β-ol 17-acetate.

No references cited.

LEWIS GOTTS, *Primary Examiner.*

MORRIS LIEBMAN, *Examiner.*